ated1,026,499A

United States Patent [19]
Shirakihara et al.

[11] Patent Number: 6,026,499
[45] Date of Patent: Feb. 15, 2000

[54] SCHEME FOR RESTARTING PROCESSES AT DISTRIBUTED CHECKPOINTS IN CLIENT-SERVER COMPUTER SYSTEM

[75] Inventors: Toshio Shirakihara; Hideaki Hirayama; Kiyoko Sato; Tatsunori Kanai, all of Kanagawa, Japan

[73] Assignee: Kabushiki Kaisha Toshiba, Kawasaki, Japan

[21] Appl. No.: 09/016,421

[22] Filed: Jan. 30, 1998

[30] Foreign Application Priority Data

Jan. 31, 1997 [JP] Japan .................................. 9-018350

[51] Int. Cl.[7] .................................................. G26F 11/00
[52] U.S. Cl. ................................ 714/11; 714/15; 714/20; 714/25; 714/38; 714/19; 714/23; 714/11; 709/105; 709/104; 709/224; 709/226
[58] Field of Search ................................ 714/11, 15, 25, 714/20, 798, 799, 19, 4, 23, 38; 364/285.2; 709/227, 203, 201, 104, 105, 226, 224

[56] References Cited

U.S. PATENT DOCUMENTS

| | | | |
|---|---|---|---|
| 4,665,520 | 5/1987 | Strom et al. ............................... | 714/15 |
| 5,008,786 | 4/1991 | Thatte ...................................... | 711/162 |
| 5,301,309 | 4/1994 | Sugano .................................... | 714/12 |
| 5,333,303 | 7/1994 | Mohan ..................................... | 714/20 |
| 5,333,314 | 7/1994 | Masai et al. ............................. | 707/202 |
| 5,590,277 | 12/1996 | Fuchs et al. ............................. | 714/38 |
| 5,634,096 | 5/1997 | Baylor et al. ............................ | 714/6 |
| 5,754,752 | 5/1998 | Sheh et al. ............................... | 714/4 |
| 5,796,934 | 8/1998 | Bhanot et al. ............................ | 714/4 |
| 5,802,267 | 9/1998 | Shirakihara et al. .................... | 714/15 |
| 5,819,019 | 10/1998 | Nelson .................................... | 714/4 |
| 5,819,022 | 10/1998 | Bandat ..................................... | 714/16 |
| 5,845,082 | 12/1998 | Murakami ............................... | 709/226 |
| 5,845,292 | 12/1998 | Bohannon et al. ...................... | 707/202 |
| 5,911,040 | 6/1999 | Hirayama et al. ....................... | 714/15 |
| 5,922,078 | 7/1999 | Hirayama et al. ....................... | 714/16 |
| 5,923,832 | 7/1999 | Shirakihara et al. .................... | 714/15 |
| 5,931,954 | 8/1999 | Hoshina et al. ......................... | 714/15 |
| 5,948,112 | 9/1999 | Shimada et al. ........................ | 714/16 |
| 5,951,694 | 9/1999 | Choquier et al. ........................ | 714/4 |

OTHER PUBLICATIONS

IEEE Publication to Bhargava et al. is cited for "Independent Checkpointing and Concurrent Rollback for recovery in Distributed system–An Optimistic Approach", 1988.

IEEE Transactions vol. SE–13 No. 1 pp. 23–31 is cited for "Checkpointing and Rollback–Recovery for Distributed System", Jan. 1987.

IEEE Publication to Leu et al. is cited for "Concurrent Robust Checkpointing and Recovery in Distributed Systems", 1988.

K. Mani Chandy, et al., "Distributed Snapshots: Determining Global States of Distributed Systems," ACM Transactions on Computer Systems, vol. 3, No. 1, (Feb. 1985), pp. 63–75.

Robert E. Strom, et al., "Optimistic Recovery in Distributed Systems," ACM Transactions on Computer Systems, vol. 3, No. 3, (Aug. 1985). pp. 204–266.

Primary Examiner—Robert W. Beausoliel, Jr.
Assistant Examiner—Wasseem Hamdan
Attorney, Agent, or Firm—Oblon, Spivak, McClelland, Maier & Neustadt, P.C.

[57] ABSTRACT

A scheme for restarting processes at distributed checkpoints in a client-server computer system, in which a fault in one client computer does not affect the server computer and the other client computers. In this scheme, a fault occurring in one computer among of a plurality of computers constituting a client-server computer system is detected while these plurality of computers are executing respective processes, and whether that one computer in which the fault is detected is a server computer or not is judged. Then, related processes executed on these plurality of computers are restarted when that one computer is judged as the server computer, whereas no process executed on these plurality of computers is restarted when that one computer is not judged as the server computer. It is also possible to specify a restart information for each process indicating how processes should be restarted when a process fault occurs in each process, and to restart selected processes executed on these plurality of computers according to the restart information for a process in which the process fault is detected.

21 Claims, 8 Drawing Sheets

▲ MESSAGE STORED
△ MESSAGE NOT STORED

▲ MESSAGE STORED
△ MESSAGE NOT STORED

| COMPUTER ID | SERVER / CLIENT |
|---|---|
| S | SERVER |
| C1 | CLIENT |
| C2 | CLIENT |

FIG.9

```
         START
           │
    ┌──────▼──────────────────┐
┌──▶│ WAIT FOR RESTART COMMAND│ ～ST91
│   │ FROM RESTART COMMAND UNIT│
│   └──────┬──────────────────┘
│          │
│   ┌──────▼──────────┐
│   │ RESTART PROCESS ON│ ～ST92
│   │   OWN COMPUTER   │
│   └──────┬──────────┘
└──────────┘
```

FIG.10

| COMPUTER ID | SERVER / CLIENT | PROCESS ID | RESTART INFORMATION |
|---|---|---|---|
| S | SERVER | 1001 | 11 |
|   |   | 1002 | 11 |
| C1 | CLIENT | 10001 | 01 |
|   |   | 10002 | 11 |
| C2 | CLIENT | 20001 | 11 |
|   |   | 20002 | 00 |
|   |   | 20003 | 11 |

SCHEME FOR RESTARTING PROCESSES AT DISTRIBUTED CHECKPOINTS IN CLIENT-SERVER COMPUTER SYSTEM

BACKGROUND OF THE INVENTION

1. Field of the Invention

The present invention relates to a scheme for restarting computers, and more particularly, to a scheme for restarting computers in cases where process states are to be acquired according to checkpoints in a client-server computer system. In the following description, a process state is to be generally construed as an information related to process execution.

2. Description of the Background Art

Conventionally, as a method for improving a reliability of program execution in a computer, the program execution method according to checkpoints has been known. This is a method in which states of processes that are executing entities of a program are acquired either regularly or irregularly according to prescribed checkpoint timings at a time of execution of the program, and the program is re-executed from the process states acquired at the nearest checkpoint when a fault occurs during the program execution. Here, the checkpoint is defined as a time for carrying out the processing to acquire the process states when the program execution is viewed in time sequence, and the checkpoint timing is defined as a time range from one checkpoint to a next checkpoint.

Now, in a system in which one process operates independently, it is sufficient to acquire the process states only at the checkpoints for intermediate states of that process, but in a case where a plurality of processes operate in relation such as that of inter-process communications, it is insufficient to acquire the process states for a single process alone according to the checkpoints. Namely, in order to prevent an occurrence of contradiction at a time of re-execution, there is a need to acquire the process states for a plurality of processes which are mutually related at each checkpoint. In the following, for the sake of convenience, a checkpoint for each process is referred to as a local checkpoint, and a set of local checkpoints for mutually related processes is referred to as a distributed checkpoint.

Also, when a fault occurs in some process or a computer on which that process is operating, it is necessary to carry out re-execute (restart) a plurality of processes by going back to the nearest checkpoint. This is usually referred to as a roll back. A case of applying such a checkpoint/restart mechanism to a distributed system will be referred to as a distributed checkpoint/restart scheme.

Conventionally known methods for acquiring process states according to distributed checkpoint can be largely classified into the following two types.

(1) A process state acquisition based on synchronous distributed checkpoint
(2) A process state acquisition based on asynchronous distributed checkpoint FIG. 1A shows an exemplary synchronous distributed checkpointing scheme, where a distributed checkpoint CH1 is indicated for a case in which three processes A, B and C execute processing while carrying out message passing.

As a scheme for acquiring process states according to synchronous checkpointing (a synchronous distributed checkpointing scheme), there is a scheme disclosed in K. Mani Chandy and L. Lamport: "Distributed Snapshots: Determining Global States of Distributed Systems", ACM Trans. of Computer Systems, Vol. 3, No. 1, pp. 63–75, February 1985. This scheme deals with the message passing as the inter-process communication, and defines the consistent distributed checkpoint as "a state without a message which is not yet transmitted and already received". More specifically, in this scheme, process states are stored in such a manner that messages that cause contradictions are detected by exchanging messages called markers at a time of storing process states according to distributed checkpoints, and these messages are stored so as to be able to construct consistent states as a whole. Consequently, at the distributed checkpoint CH1 shown in FIG. 1A, each checkpoint is set in a consistent state with respect to each message.

On the other hand, FIG. 1B shows an exemplary asynchronous distributed checkpointing scheme. As indicated in FIG. 1B, in the asynchronous distributed checkpointing scheme, a process state is acquired according to a checkpoint which is located at arbitrary timing in each process. As a scheme for realizing asynchronous checkpointing scheme, there is a scheme disclosed in R. E. Strom and S. Yemini: "Optimistic Recovery in Distributed Systems", ACM Trans. Computer Systems, Vol. 3, No. 3, pp. 204–226, August 1985. In this scheme, when a fault occurs in a process B, the process B is rolled back to a checkpoint CHb, but then this process B requires reproduction of messages m5 and m6 so that the processes A and C are also rolled back to checkpoints CHa and CHc respectively. Then, the process C requires reproduction of a message m4 so that there is a need to further rolled back the process B to a checkpoint earlier than the checkpoint CHb. This state of chained roll back of processes is called a cascade roll back.

In the asynchronous checkpointing scheme, a method called message logging is adopted in order to store received messages at each process so as to prevent the cascade roll back. Namely, in FIG. 1B, those messages for which storing has been completed are indicated by black triangles while those messages for which storing has not been completed are indicated by blank triangles. In FIG. 1B, when a fault occurs in the process B, the process B is restarted from the checkpoint CHb, and a state immediately before receiving the message m6 can be re-executed because the message m5 is stored, but the message m6 is lost so that the process C is also re-executed from the checkpoint CHc so as to re-execute receiving of the stored message m4 and transmitting of the message m6. As for the process A, its execution is continued without any roll back.

Here, each process carries out the receiving processing after the restart according to the stored messages so that an operation of each process must be deterministic (that is, reproductive when the same processing is re-executed again and again). This is because if an operation of the process is indeterministic then there would be a possibility for a transmitting side process to generate a message different from the received message that is already stored.

As described, according to the distributed checkpointing scheme, when a fault occurs in one process or computer, the roll back/restart is caused not just for that one process but also for the other processes which are mutually related with that one process.

FIG. 2 shows a conceptual configuration of a system in the client-server model which is a general model for distributed system. FIG. 2 shows an exemplary case where three processes A, B and C of FIGS. 1A and 1B are operating on a client computer C1, a client computer C2 and a server computer S, respectively. Usually, in the client-server system, client computers C1 and C2 are terminals to be directly used by users, and client processes on a plurality of client computers request processing to a server process on the server computer S. The server process then carries out the request processing and returns a processing result to the client process, and then the client process displays the result received from the server on a screen so as to notify the user.

FIGS. 3A and 3B conceptually show the distributed checkpoint/restart scheme, where FIG. 3A shows a case of the synchronous distributed checkpointing scheme while FIG. 3B shows a case of the asynchronous distributed checkpointing scheme, for an exemplary state in which a fault occurred in the client computer C1 at a timing F1. In either scheme, as the fault occurred in the process A, the processes B and C are also to be restarted from the nearest checkpoints.

In general, the client computer has a lower reliability than the server computer so that the machine malfunction occurs more frequently for the client computer, and as described above, the conventional distributed checkpoint/restart schemes are associated with the problem that, when the fault occurs in one client computer, the entire system including the other client computers and the server computer are to be rolled back. This problem is a very serious one in a case of the client-server system comprising one server computer and hundreds of client computers, because there is a possibility for all the processes on client computers of all users to be rolled back when a client computer used by just one user malfunctions.

SUMMARY OF THE INVENTION

It is therefore an object of the present invention to provide a scheme for restarting processes at distributed checkpoints in a client-server computer system, in which a fault in one client computer does not affect the server computer and the other client computers.

According to one aspect of the present invention there is provided a method for restarting processes in a client-server computer system formed by a plurality of computers, comprising the steps of: detecting a fault occurring in one computer among of said plurality of computers while said plurality of computers are executing respective processes; judging whether said one computer in which the fault is detected is a server computer or not; and restarting related processes executed on said plurality of computers when said one computer is judged as the server computer, and not restarting any process executed on said plurality of computers when said one computer is not judged as the server computer.

According to another aspect of the present invention there is provided a method for restarting processes in a client-server computer system formed by a plurality of computers, comprising the steps of: specifying a restart information for each process indicating how processes should be restarted when a process fault occurs in each process; detecting a process fault occurring in one process executed on one computer among said plurality of computers while said plurality of computers are executing respective processes; and restarting selected processes executed on said plurality of computers according to the restart information for said one process in which the process fault is detected.

According to another aspect of the present invention there is provided an apparatus for restarting processes in a client-server computer system formed by a plurality of computers, comprising: a fault detection unit for detecting a fault occurring in one computer among of said plurality of computers while said plurality of computers are executing respective processes; a judgment unit for judging whether said one computer in which the fault is detected is a server computer or not; and a restart command unit for commanding said plurality of computers to restart related processes executed on said plurality of computers when said one computer is judged as the server computer, and not to restart any process executed on said plurality of computers when said one computer is not judged as the server computer.

According to another aspect of the present invention there is provided an apparatus for restarting processes in a client-server computer system formed by a plurality of computers, comprising: an information management unit for specifying a restart information for each process indicating how processes should be restarted when a process fault occurs in each process; a fault detection unit for detecting a process fault occurring in one process executed on one computer among said plurality of computers while said plurality of computers are executing respective processes; and a restart command unit for commanding said plurality of computers to restart selected processes executed on said plurality of computers according to the restart information for said one process in which the process fault is detected.

According to another aspect of the present invention there is provided an article of manufacture, comprising: a computer usable medium having computer readable program code means embodied therein for causing a computer to function as an apparatus for restarting processes in a client-server computer system formed by a plurality of computers, the computer readable program code means includes: first computer readable program code means for causing said computer to detect a fault occurring in one computer among of said plurality of computers while said plurality of computers are executing respective processes; second computer readable program code means for causing said computer to judge whether said one computer in which the fault is detected is a server computer or not; and third computer readable program code means for causing said computer to command said plurality of computers to restart related processes executed on said plurality of computers when said one computer is judged as the server computer, and not to restart any process executed on said plurality of computers when said one computer is not judged as the server computer.

According to another aspect of the present invention there is provided an article of manufacture, comprising: a computer usable medium having computer readable program code means embodied therein for causing a computer to function as an apparatus for restarting processes in a client-server computer system formed by a plurality of computers, the computer readable program code means includes: first computer readable program code means for causing said computer to specify a restart information for each process indicating how processes should be restarted when a process fault occurs in each process; second computer readable program code means for causing said computer to detect a process fault occurring in one process executed on one computer among said plurality of computers while said plurality of computers are executing respective processes; and third computer readable program code means for causing said computer to command said plurality of computers to restart selected processes executed on said plurality of computers according to the restart information for said one process in which the process fault is detected.

Other features and advantages of the present invention will become apparent from the following description taken in conjunction with the accompanying drawings.

BRIEF DESCRIPTION OF THE DRAWINGS

FIG. 9 is a flow chart for the operation of a process restart unit in the system of FIG. 4 according to the first embodiment of the present invention.

FIG. 10 is a diagram showing an exemplary computer and process information stored by a computer information management unit in the system of FIG. 4 according to the second embodiment of the present invention.

DETAILED DESCRIPTION OF THE PREFERRED EMBODIMENTS

Referring now to FIG. 4 to FIG. 9, the first embodiment of a scheme for restarting processes at distributed checkpoints in a client-server computer system according to the present invention will be described in detail.

Figure 1A:
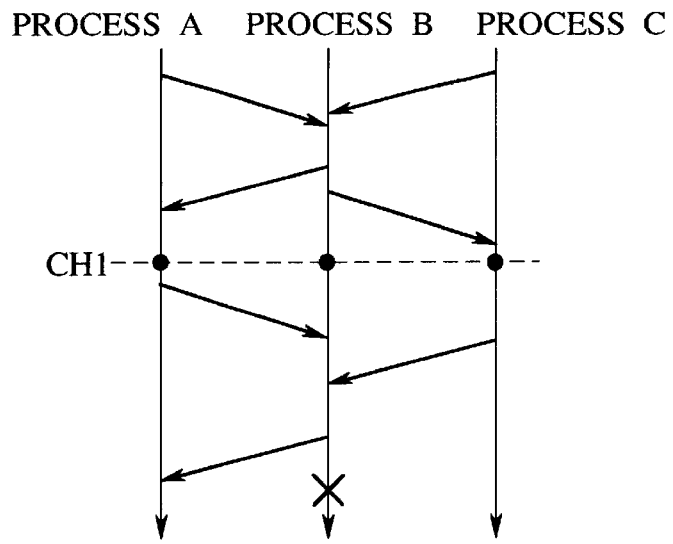
FIGS. 1A and 1B are diagrams for explaining conventional synchronous and asynchronous distributed checkpointing schemes.
Figure 1B:
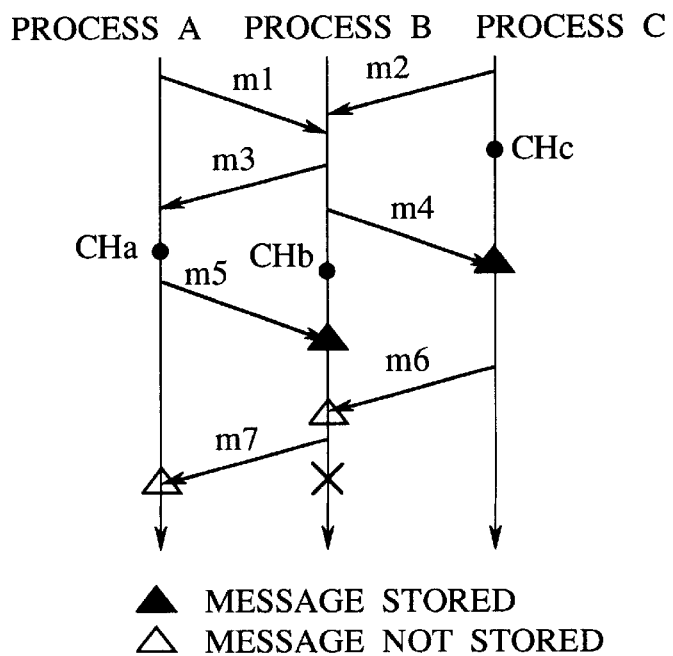
Figure 2:
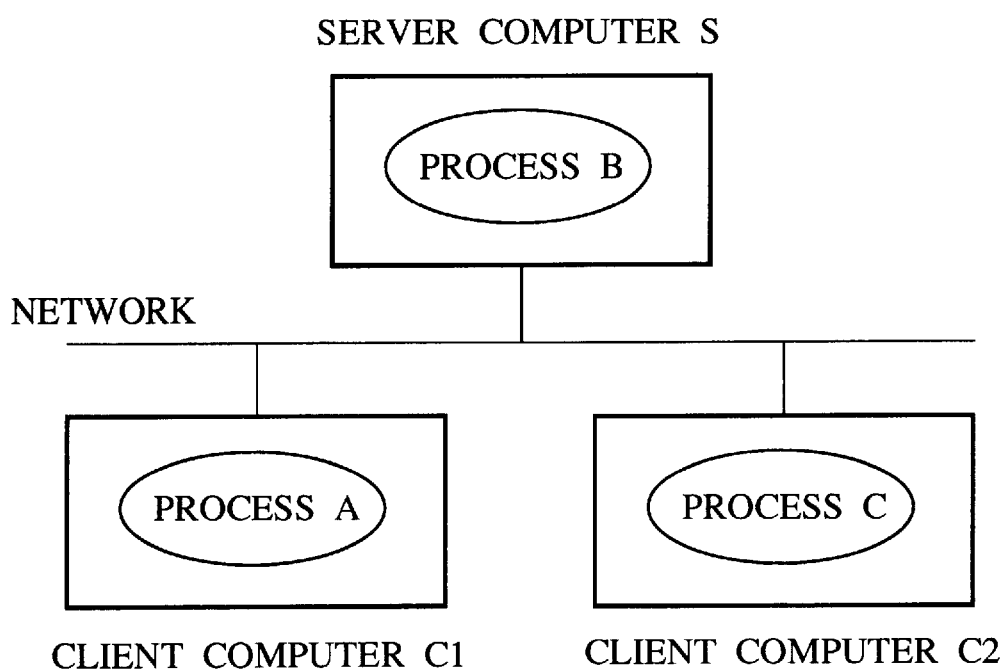
FIG. 2 is a schematic block diagram of a general client-server computer system.
Figure 3A:
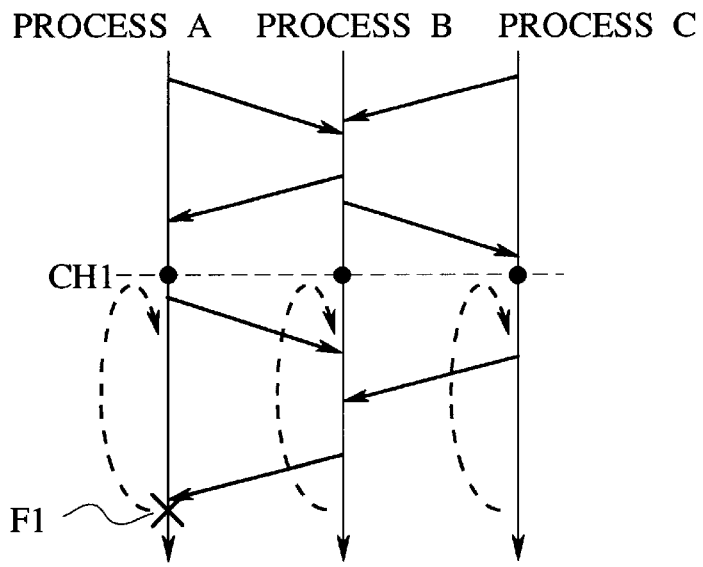
FIGS. 3A and 3B are diagrams for explaining conventional synchronous and asynchronous distributed checkpoint/restart schemes.
Figure 3B:
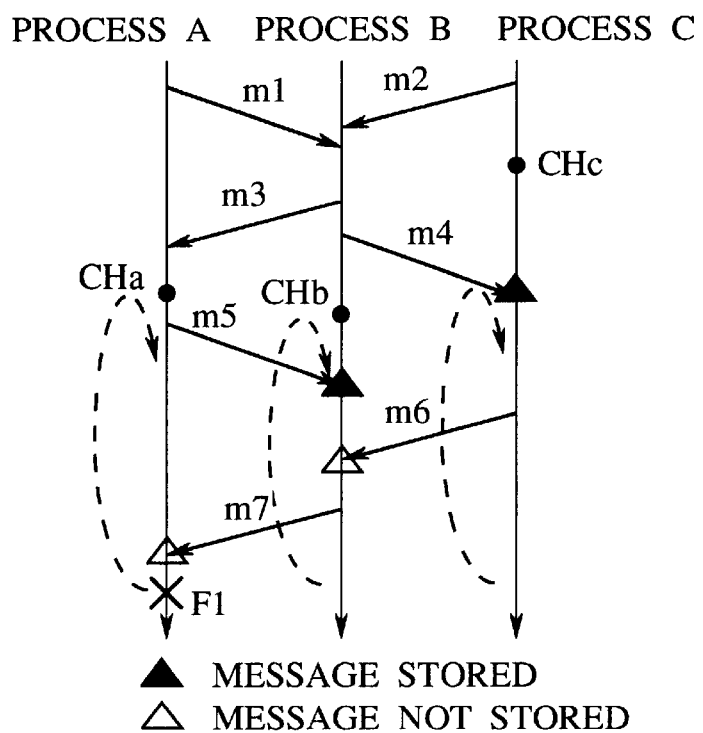
Figure 4:
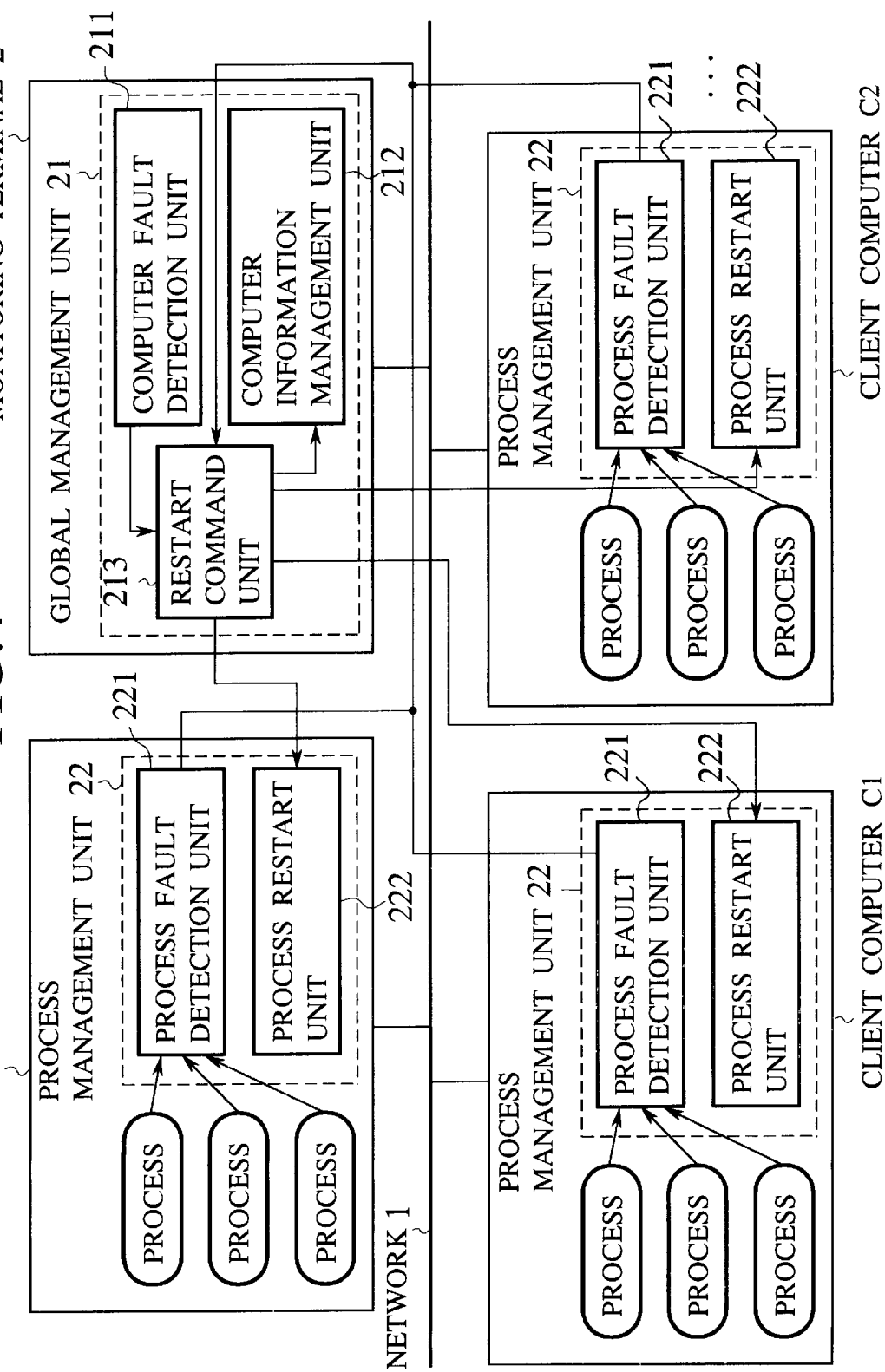
FIG. 4 is a block diagram of a client-server computer system for realizing a scheme for restarting processes at distributed checkpoints according to the present invention.

FIG. 4 shows a configuration of a client-server computer system for realizing the scheme for restarting processes at distributed checkpoints in this first embodiment, which comprises a server computer S on which a server process operates, client computers C1, C2, etc., to be used by individual users, on which client processes operate, and a monitoring terminal 2 for monitoring the entire system, all of which are inter-connected through a network 1.

In FIG. 4, only one server computer S is connected to the network 1, but the present invention is not limited to this particular case, and a plurality of server computers may exist on the network 1. Also, the monitoring terminal 2 can be realized as an independent computer provided separately from the server computer S and the client computers C1 and C2, but if desired the monitoring terminal 2 may be provided within the server computer S or on a plurality of server computers instead.

The monitoring terminal 2 has a global management unit 21 provided therein. This global management unit 21 comprises a computer fault detection unit 211 for monitoring operation states of computers on the network 1 and detecting faults in these computers, a computer information management unit 212 for managing information as to whether each monitored computer is the server computer S or the client computer C1 or C2, and a restart command unit 213 for commanding the restart to each computer. This global management unit 21 can be realized by hardware or software, or a combination of both.

The computer fault detection unit 211 monitors operation states of computers on the network 1 and detects faults in these computers. This fault detection can be realized, for example, by sending an operation check signal to each computer at regular time interval, and a computer which failed to return a response signal to that operation check signal within a tolerable period of time is judged to have caused a fault (malfunctioned). As another example, this fault detection can also be realized as follows. Namely, each computer sends an alive signal indicating that it is in an executing state, to the computer fault detection unit 211 at regular time interval, and the computer fault detection unit 211 judges a computer from which the alive signal is received at the regular time interval as operating normally, and a computer from which the alive signal does not arrive after a prescribed period of time to have caused a fault.

Figures 5, 6:
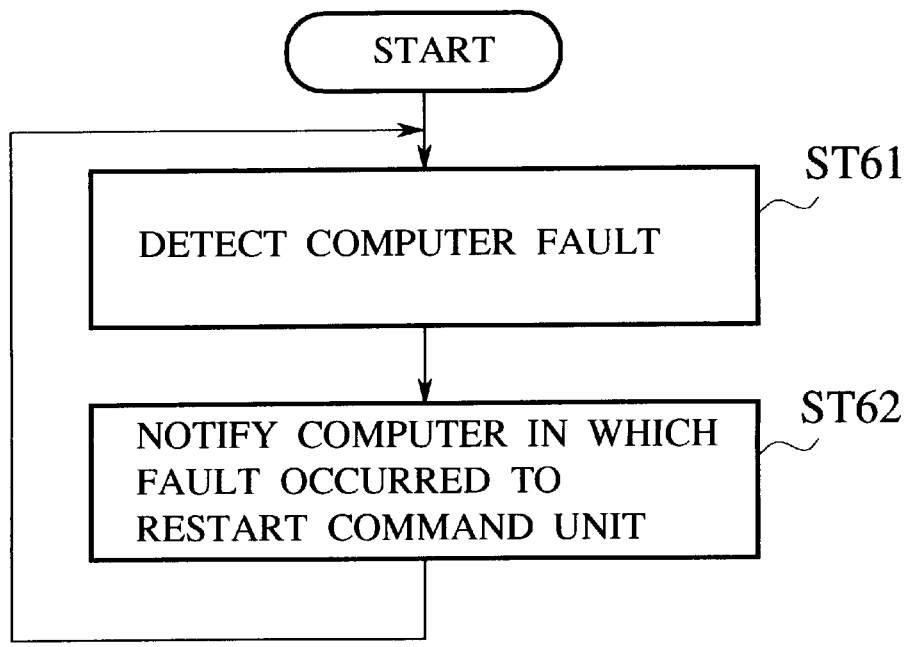
FIG. 5 is a diagram showing an exemplary computer information stored by a computer information management unit in the system of FIG. 4 according to the first embodiment of the present invention.
FIG. 6 is a flow chart for the operation of a computer fault detection unit in the system of FIG. 4 according to the first embodiment of the present invention.

FIG. 5 shows an exemplary computer information stored in the computer information management unit 212. As shown in FIG. 5, the computer information management unit 212 maintains information as to whether each computer connected on the network 1 is the server computer or the client computer. In this first embodiment, only two types of server computer and client computer are defined, but the present invention is not limited to this particular case and more than two computer types may be defined if desired.

The restart command unit 213 commands the restart to each computer by referring to the computer information management unit 212 according to a notice from the computer fault detection unit 211 or a process fault detection unit provided in each computer which will be described below, depending on the computer type of each computer. More specifically, the restart command unit 213 checks the information stored in the computer information management unit 212, and sends a restart command to a process restart unit of every computer when a computer which caused a fault is judged as the server computer, or awaits for a next request without sending any restart command when a computer which caused a fault is judged as the client computer. Note that, as will be described below, the process restart unit of a computer which received the restart command is going to restart the process on that computer.

Each of the server computer S and the client computers C1 and C2 has a process management unit 22 for managing a process executed thereon. The process management unit 22 comprises a process fault detection unit 211 for detecting a fault in the own process and a process restart unit 222 for actually restarting the own process.

Now, with references to the flow charts of FIG. 6 to FIG. 9, the operations of various elements constituting the system of FIG. 4 will be described in further details.

First, the operation in a case where a computer fault is detected by the computer fault detection unit 211 will be described.

FIG. 6 shows a flow chart for the operation of the computer fault detection unit 211 in this case. As shown in FIG. 6, the computer fault detection unit 211 detects a computer fault (step ST61) whenever it occurs, and then notifies a computer in which the fault occurred to the restart command unit 213 (step ST62).

Figure 7:
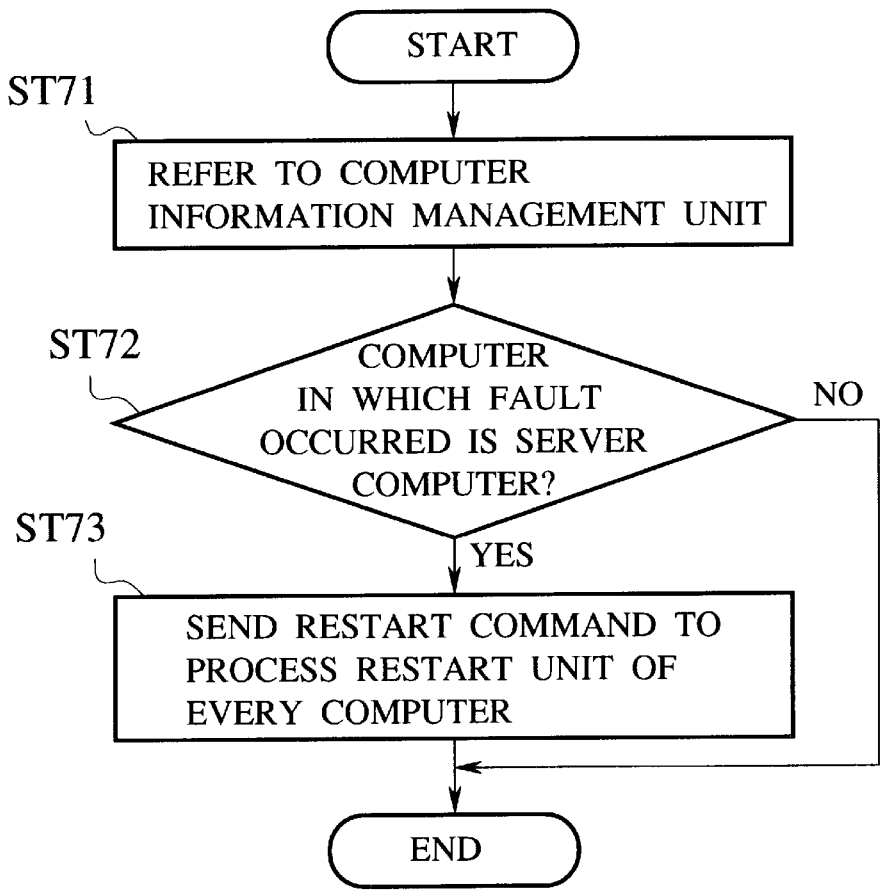
FIG. 7 is a flow chart for the operation of a restart command unit in the system of FIG. 4 according to the first embodiment of the present invention.

FIG. 7 shows a flow chart for the operation of the restart command unit 213 in this case. As shown in FIG. 7, upon receiving the notice from the computer fault detection unit 211, the restart command unit 213 refers to the computer information stored in the computer information management unit 212 (step ST71), and judges whether the notified computer in which the fault occurred is the server computer or not (step ST72). When the notified computer in which the fault occurred is judged as the server computer, the restart command unit 213 sends a restart command to the process restart unit 222 of every computer. On the other hand, when the notified computer in which the fault occurred is judged as the client computer, the restart command unit 213 returns to a waiting state without carrying out any particular processing, in this first embodiment.

Next, the operation in a case where a process fault is detected by the process fault detection unit 211 will be described.

Figure 8:
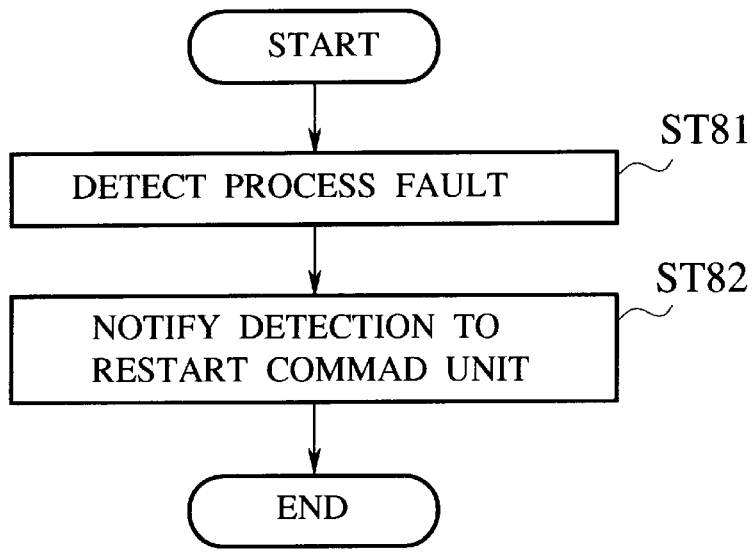
FIG. 8 is a flow chart for the operation of a process fault detection unit in the system of FIG. 4 according to the first embodiment of the present invention.

FIG. 8 shows a flow chart for the operation of the process fault detection unit 221 in this case. As shown in FIG. 8, the process fault detection unit 221 monitors the own process, and detects a process fault (step ST81) whenever it occurs, and then notifies this fact to the restart command unit 213 of the monitoring terminal 2 (step ST82).

Upon receiving the notice from the process fault detection unit 221, the restart command unit 213 refers to the computer information stored in the computer information management unit 212, and judges whether a computer in which the fault occurred is the server computer or not. When the computer in which the fault occurred is judged as the server computer, the restart command unit 213 sends a restart command to the process restart unit 222 of every computer. On the other hand, when the computer in which the fault occurred is judged as the client computer, the restart command unit 213 returns to a waiting state without carrying out any particular processing, in this first embodiment.

FIG. 9 shows a flow chart for the operation of the process restart unit 222 in both cases. As shown in FIG. 9, the process restart unit 222 is in a waiting state until there is a restart command from the restart command unit 213 (step ST91). Then, when the restart command is received from the restart command unit 213, the process restart unit 222 restarts the process on the own computer (step ST92).

By these operations, the process restart takes place over the entire system when the fault occurs in the server computer S, whereas no process restart takes place anywhere in the system when the fault occurs in the client computer. Consequently, even when the fault occurs in one client computer, the server computer and the other client computers are not affected by the fault occurred on that one client computer according to this first embodiment.

Also, the checkpoint information (an internal state of the process and the like according to the checkpoint) is usually stored in a stable memory such as disks, but according to this first embodiment, when the fault occurs in the client computer, the process on this client computer will not be restarted so that its checkpoint information is no longer necessary. For this reason, in this first embodiment, it is possible to store the checkpoint information in a volatile memory medium and as a consequence it becomes possible to realize a high speed checkpoint information generation.

It is to be noted that the first embodiment has been described above for a case of restarting all processes in the entire system when a fault occurs in the server computer, but the present invention is not necessarily limited to this particular case, and it is possible to modify the above described first embodiment in such a way that a plurality of related processes are to be restarted when a fault occurs in the server computer. Namely, it is possible to introduce a concept of a distributed restart for restarting a plurality of related processes. Here, related processes in the distributed restart can be all processes on a plurality of computers as described above, or a plurality of processes which are related with each other according to a distributed checkpoint/restart scheme as disclosed in Japanese Patent Application No. 8-59188 (1996), for example. In response to a distributed restart command, all processes on computers which received the distributed restart command may be restarted, or certain specific processes on these computers which are specified by the distributed restart command may be restarted.

Figure 11:
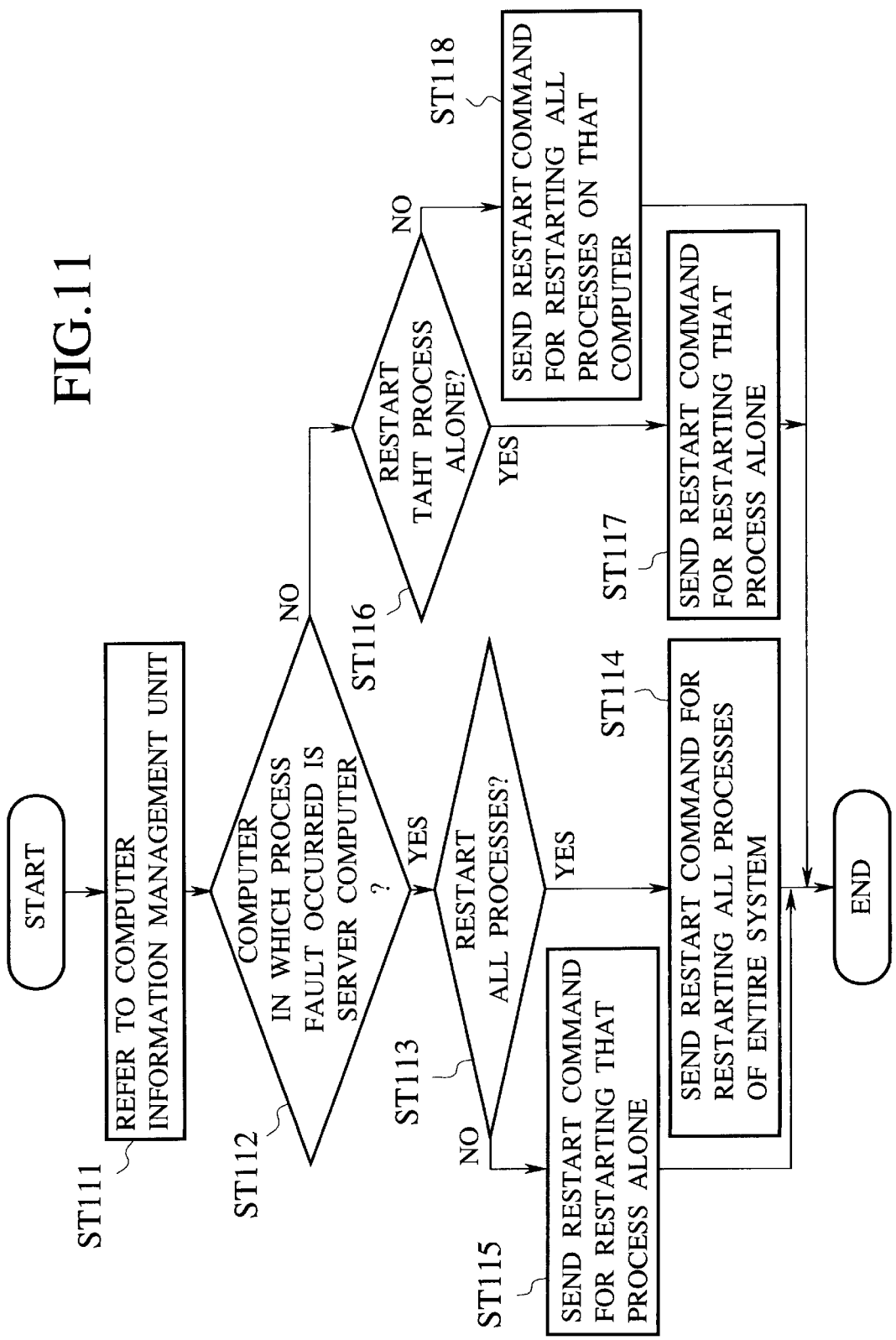
FIG. 11 is a flow chart for the operation of a restart command unit in the system of FIG. 4 according to the second embodiment of the present invention.

Referring now to FIG. 10 and FIG. 11, the second embodiment of a scheme for restarting processes at distributed checkpoints in a client-server computer system according to the present invention will be described in detail.

In the first embodiment described above, the process restart is carried out depending on the computer type, but in this second embodiment, the process restart is carried out depending on the process type. In this second embodiment, the system configuration is the same as that of FIG. 4 described above, except that the computer information management unit 212 maintains computer and process information according to which the process restart is to be controlled.

FIG. 10 shows an exemplary computer and process information stored in the computer information management unit 212 in this second embodiment. As shown in FIG. 10, the computer information management unit 212 in this second embodiment has information as to whether or not to restart each process of each computer when the fault occurs in that process. More specifically, in FIG. 10, a process ID indicates a unique value assigned to each process for the purpose of managing processes. In general, it suffices for each computer to have unique identifiers for its processes. Also, a restart information of each process indicates how processes should be restarted when the fault occurs in each process.

Here, the numerical value of the restart information has the following meaning. The restart information for the process ID "1001" and "1002" of the server is "11" which indicates that the own process as well as the other processes are to be restarted when the fault occurs in either one of these processes. Here, in a case of the restart in the server computer, this restart information "11" implies the restart of client processes as well. In general, the fault in the server computer affects the entire system so that a value "11" is given to the server processes, but it is also possible to give a value "01", for example, to the server processes so that only each server process is restarted when the fault occurs in each server process.

On the other hand, the restart information for the process ID "10001" is "01" which indicates that this process on the client computer C1 alone is to be restarted when the fault occurs in this process. Also, the restart information for the process ID "10002" is "11" which in this case indicates that all the processes operating on the client computer C1 are to be restarted when the fault occurs in this process. The restart command unit 213 sends restart commands appropriately according to the restart information.

FIG. 11 shows a flow chart for the operation of the restart command unit 213 in this second embodiment. In FIG. 11, when a notice indicating an occurrence of a process fault is received from the process fault detection unit 221, the restart command unit 213 refers to the computer information management unit 212 and obtains necessary information (step ST111). Then, the restart command unit 213 judges whether the detected process fault is a process fault in the server computer or a process fault in the client computer according to the obtained computer and process information (step ST112).

When it is judged as the process fault in the server computer, the restart command unit 213 judges whether the restart of all processes is required or the restart of that process alone is required according to the restart information (step ST113). Then, when the restart of all processes is required, that is when the restart information is "11", the restart command unit 213 sends a restart command for restarting all processes to the process restart unit 222 of every computer in order so as to restart all processes of the entire system (step S114). On the other hand, when the restart of that process alone is required, that is when the restart information is "01", the restart command unit 213 sends a restart command for restarting that process alone to the process restart unit 222 of that server computer (step ST115).

Also, when it is judged as the process fault in the client computer at the step ST112, the restart command unit 213 judges whether the restart of that process alone is required or the restart of all processes on that client computer is required according to the restart information (step ST116). Then, when the restart of that process alone is required, the restart command unit 213 sends a restart command for restarting that process alone to the process restart unit 222 of that client computer (step ST117). On the other hand, when the restart of all processes on that client computer is required, the restart command unit 213 sends a restart command for restarting all processes on that client computer to the process restart unit 222 of that client computer (step ST118).

By the above operation, it becomes possible in this second embodiment to carry out the restart of each process selectively according to the process type. In particular, when an operation of some process does not affect the other processes, it is possible to operate the system efficiently by restarting that process alone.

It is to be noted that the restart information used in this second embodiment may be modified such that a group of computers having strong mutual dependency is defined and all the computers of that group are to be restart when a fault occurs in any of the computers of that group.

As described, according to the present invention, it is possible to realize a highly reliable client-server system using the distributed checkpoint/restart scheme, in which it is possible to prevent a fault in one client computer from affecting the entire system.

It is also to be noted that the above described embodiments according to the present invention may be conveniently implemented using conventional general purpose digital computers programmed according to the teachings of the present specification, as will be apparent to those skilled in the computer art. Appropriate software coding can readily be prepared by skilled programmers based on the teachings of the present disclosure, as will be apparent to those skilled in the software art.

In particular, each element of the system configuration shown in FIG. 4 described above either separately or in suitable combination can be conveniently implemented in forms of software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for restarting processes at distributed checkpoints in a client-server computer system formed by a plurality of computers, comprising the steps of:

detecting a fault occurring in one computer among of said plurality of computers while said plurality of computers are executing respective processes;

judging whether said one computer in which the fault is detected is a server computer or not; and restarting related processes executed on said plurality of computers when said one computer is judged as the server computer, and not restarting any process executed on said plurality of computers when said one computer is not judged as the server computer.

2. The method of claim 1, wherein the detecting step detects either a computer fault occurring in any of said plurality of computers or a process fault occurring in any process executed on said plurality of computers as said fault.

3. The method of claim 1, further comprising the step of:

acquiring process states for each process at prescribed checkpoints while said plurality of computers are executing respective processes;

wherein the restarting step restarts said processes from said prescribed checkpoints, according to the process states acquired at said prescribed checkpoints.

4. A method for restarting processes at distributed checkpoints in a client-server computer system formed by a plurality of computers, comprising the steps of:

specifying a restart information for each process indicating how processes should be restarted when a process fault occurs in each process;

detecting a process fault occurring in one process executed on one computer among said plurality of computers while said plurality of computers are executing respective processes; and restarting selected processes executed on said plurality of computers according to the restart information for said one process in which the process fault is detected.

5. The method of claim 4, wherein the specifying step specifies the restart information differently for server processes executed on a server computer and client processes executed on a client computer.

6. The method of claim 4, wherein the restart information specified for one server process executed on a server computer indicates either restarting all processes executed on said plurality of computers or restarting said one server process alone.

7. The method of claim 4, wherein the restart information specified for one client process executed on one client computer indicates either restarting all client processes executed on said one client computer or restarting said one client process alone.

8. An apparatus for restarting processes at distributed checkpoints in a client-server computer system formed by a plurality of computers, comprising:

a fault detection unit for detecting a fault occurring in one computer among of said plurality of computers while said plurality of computers are executing respective processes;

a judgment unit for judging whether said one computer in which the fault is detected is a server computer or not; and a restart command unit for commanding said plurality of computers to restart related processes executed on said plurality of computers when said one computer is judged as the server computer, and not to restart any process executed on said plurality of computers when said one computer is not judged as the server computer.

9. The apparatus of claim 8, wherein the fault detection unit includes a computer fault detection unit for detecting a computer fault occurring in any of said plurality of computers and a process fault detection unit for detecting a process fault occurring in any process executed on said plurality of computers.

10. The apparatus of claim 8, further comprising:
a process state acquisition unit for acquiring process states for each process at prescribed checkpoints while said plurality of computers are executing respective processes;
wherein the restart command unit commands said plurality of computers to restart said processes from said prescribed checkpoints, according to the process states acquired at said prescribed checkpoints.

11. An apparatus for restarting processes at distributed checkpoints in a client-server computer system formed by a plurality of computers, comprising:
an information management unit for specifying a restart information for each process indicating how processes should be restarted when a process fault occurs in each process;
a fault detection unit for detecting a process fault occurring in one process executed on one computer among said plurality of computers while said plurality of computers are executing respective processes; and
a restart command unit for commanding said plurality of computers to restart selected processes executed on said plurality of computers according to the restart information for said one process in which the process fault is detected.

12. The apparatus of claim 11, wherein the information management unit specifies the restart information differently for server processes executed on a server computer and client processes executed on a client computer.

13. The apparatus of claim 11, wherein the restart information specified for one server process executed on a server computer indicates either restarting all processes executed on said plurality of computers or restarting said one server process alone.

14. The apparatus of claim 11, wherein the restart information specified for one client process executed on one client computer indicates either restarting all client processes executed on said one client computer or restarting said one client process alone.

15. An article of manufacture, comprising:
a computer usable medium having computer readable program code means embodied therein for causing a computer to function as an apparatus for restarting processes at distributed checkpoints in a client-server computer system formed by a plurality of computers, the computer readable program code means includes:
first computer readable program code means for causing said computer to detect a fault occurring in one computer among of said plurality of computers while said plurality of computers are executing respective processes;
second computer readable program code means for causing said computer to judge whether said one computer in which the fault is detected is a server computer or not; and third computer readable program code means for causing said computer to command said plurality of computers to restart related processes executed on said plurality of computers when said one computer is judged as the server computer, and not to restart any process executed on said plurality of computers when said one computer is not judged as the server computer.

16. The article of manufacture of claim 15, wherein the first computer readable program code means detects either a computer fault occurring in any of said plurality of computers or a process fault occurring in any process executed on said plurality of computers.

17. The article of manufacture of claim 15, further comprising:
fourth computer readable program code means for causing said computer to acquire process states for each process at prescribed checkpoints while said plurality of computers are executing respective processes;
wherein the third computer readable program code means commands said plurality of computers to restart said processes from said prescribed checkpoints, according to the process states acquired at said prescribed checkpoints.

18. An article of manufacture, comprising:
a computer usable medium having computer readable program code means embodied therein for causing a computer to function as an apparatus for restarting processes at distributed checkpoints in a client-server computer system formed by a plurality of computers, the computer readable program code means includes:
first computer readable program code means for causing said computer to specify a restart information for each process indicating how processes should be restarted when a process fault occurs in each process;
second computer readable program code means for causing said computer to detect a process fault occurring in one process executed on one computer among said plurality of computers while said plurality of computers are executing respective processes; and
third computer readable program code means for causing said computer to command said plurality of computers to restart selected processes executed on said plurality of computers according to the restart information for said one process in which the process fault is detected.

19. The article of manufacture of claim 18, wherein the first computer readable program code means specifies the restart information differently for server processes executed on a server computer and client processes executed on a client computer.

20. The article of manufacture of claim 18, wherein the restart information specified for one server process executed on a server computer indicates either restarting all processes executed on said plurality of computers or restarting said one server process alone.

21. The article of manufacture of claim 18, wherein the restart information specified for one client process executed on one client computer indicates either restarting all client processes executed on said one client computer or restarting said one client process alone.

* * * * *